Figure 1:
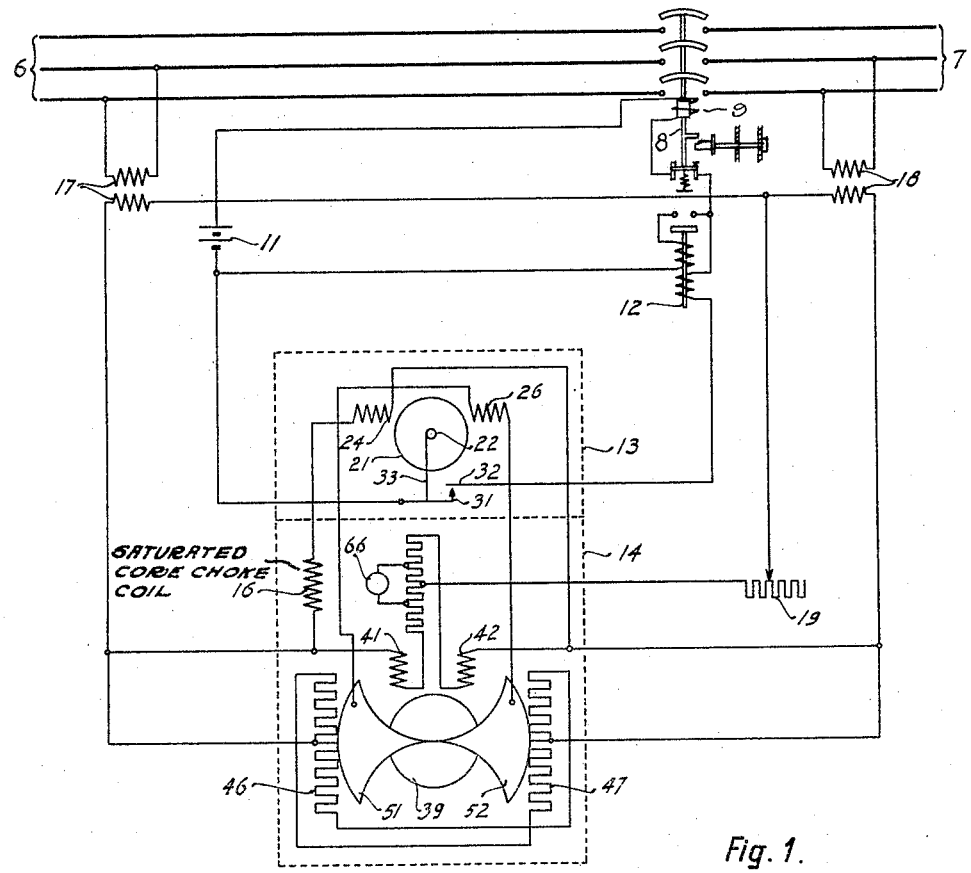

March 21, 1933.  R. KELLER  1,902,645
AUTOMATIC PARALLEL CONNECTING SYSTEM
Filed Feb. 18, 1931  2 Sheets-Sheet 1

Inventor
Robert Keller
By
Attorney

March 21, 1933.  R. KELLER  1,902,645
AUTOMATIC PARALLEL CONNECTING SYSTEM
Filed Feb. 18, 1931  2 Sheets-Sheet 2

Inventor
Robert Keller
By (signature)
Attorney

Patented Mar. 21, 1933

1,902,645

UNITED STATES PATENT OFFICE

ROBERT KELLER, OF ENNETBADEN, SWITZERLAND, ASSIGNOR TO AKTIENGESELL-SCHAFT BROWN BOVERI & CIE., OF BADEN, SWITZERLAND, A JOINT-STOCK COMPANY OF SWITZERLAND

AUTOMATIC PARALLEL CONNECTING SYSTEM

Application filed February 18, 1931, Serial No. 516,655, and in Germany February 27, 1930.

This invention relates to improvements in systems for connecting sources of electric current or for connecting electric current lines in parallel and particularly to a system by which the sources or lines are automatically synchronized and connected.

In the automatic paralleling of two electric current lines, it frequently happens that the actual voltages differ greatly from the rated voltages of the two sources of current or lines to be connected in parallel. Cases occur in practice in which synchronization is frequently necessary even at operating voltage variations of as much as plus or minus 30% of the normal voltage. In the cases above mentioned, parallel connection had to be made heretofore when the difference in frequency was very great. In other words; if the parallel connecting device was adjusted for proper operation at the normal voltages, it was necessary that the frequency be very exactly regulated for synchronization at very much decreased voltages, while, at very much increased voltages, the arrangement would synchronize at large frequency differences.

It is, therefore, not sufficient to construct the switching arrangement so that it operates properly under all the above circumstances, but it must be so constructed as to utilize all the conditions present because automatic synchronization is desirable, particularly in cases of disturbance in operation, to place the sources of current or the transmission lines in the operative condition as safely and as quickly as possible.

It is, therefore, among the objects of the present invention to provide a system for the automatic connection in parallel of sources of alternating current or alternating current lines when within predetermined degree of synchronism as to frequency and phase which will operate properly even when the operating voltages differ widely from the rated voltages of the sources of current or current lines to be connected in parallel.

Another object of the invention is to provide for the automatic connection in parallel of sources of alternating current or alternating current lines when within a predetermined degree of synchronism as to frequency and phase independently of the magnitude of the operating voltage.

Another object of the invention is to provide a system for the automatic connection, in parallel, of sources of alternating current or alternating current circuits when within a predetermined degree of synchronism, as to frequency and phase angle, in such manner as to prevent such connection upon a material increase of the frequency range relative to the frequency range at the rated voltages.

Figure 2:
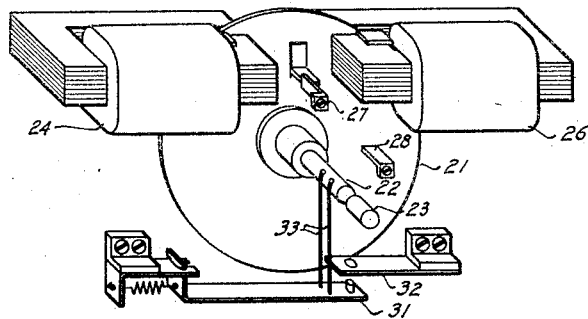
Figure 3:
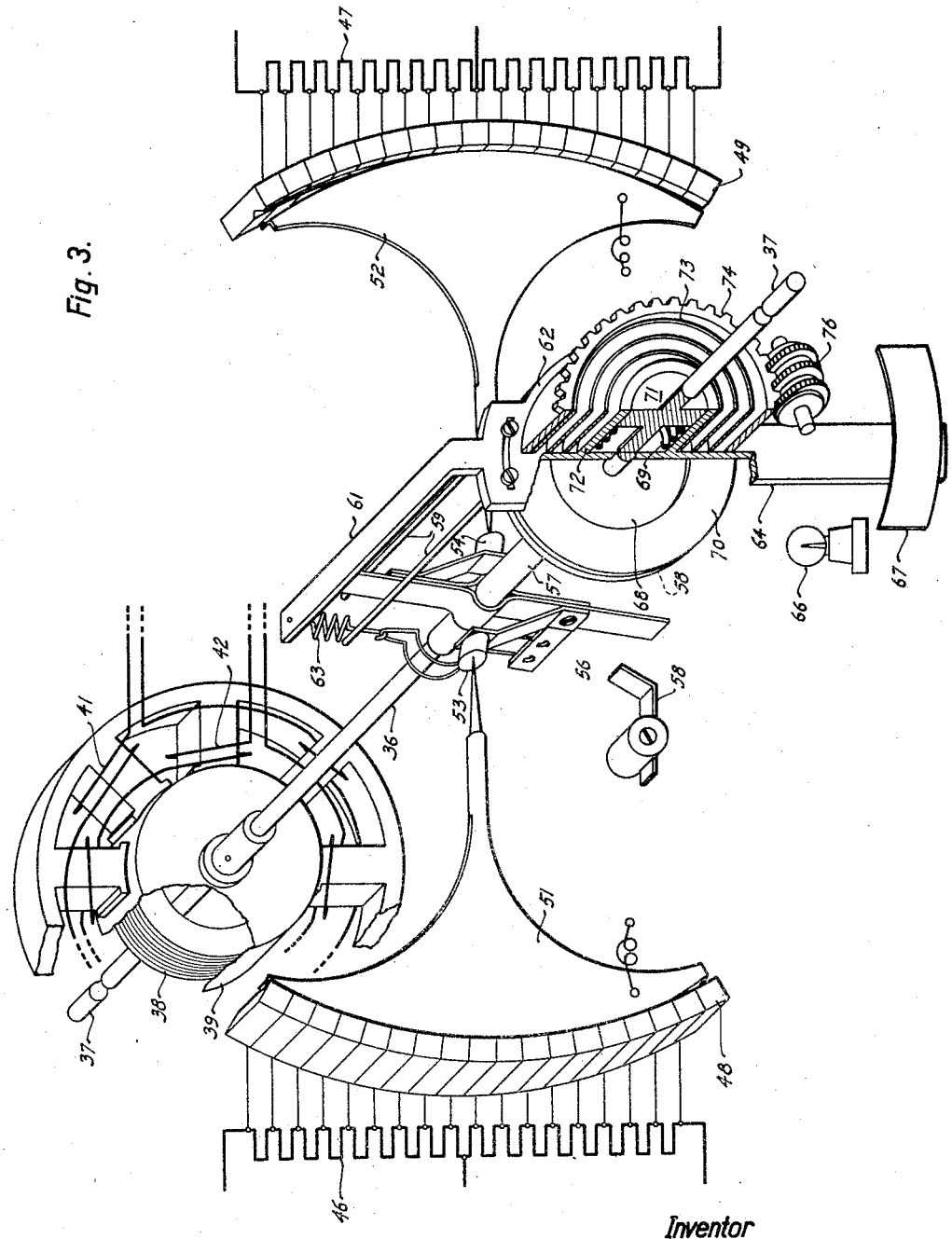

Objects and advantages, other than those above set forth, will be apparent from the following description when read in connection with the accompanying drawings in which Figure 1 diagrammatically illustrates an automatic parallel connecting system embodying the features of the present invention, Fig. 2 shows the constructional details of a relay structure utilized in the system illustrated in Fig. 1, and Fig. 3 illustrates a relay regulating device which is utilized in the system shown in Fig. 1.

Referring more particularly to the drawings by characters of reference, reference numerals 6 and 7 designate the sources of current or the current lines to be connected by a suitable circuit breaker 8 which is controlled by a closing coil 9 energized from a source of current 11. Application of current from source 11 to coil 9 is controlled by a relay 12 having an operating and a holding coil which relay is itself energized upon closing of the circuit to its operating coil by a time lag relay generally designated at 13. The operation of the time lag relay is partially controlled by the voltage supplied to one coil thereof through a regulating device 14. A second coil of relay 13 is supplied with a suitable voltage through a choke coil 16 having a saturated core. The control voltages supplied to the relay 13 by the regulator 14 are obtained from the lines 6 and 7 through voltage transformers 17 and 18, and the motive system of the regulator is also energized from the transformers 17 and 18 through an adjustable resistance 19. It will be seen that the secondary winding of the transformers 17 and 18 are connected in series.

The time lag relay shown diagrammatically at 13 in Fig. 1, is shown in perspective in Fig. 2 and includes a disc 21 secured on a spindle 22 which is mounted in jewelled bearings 23. The disc 21 is rotatable under the influence of opposing torques produced by two electro-magnets 24 and 26, for a distance determined by the stops 27 and 28. The electro-magnet coil 26 is energized by the total voltage of transformers 17 and 18 as transmitted through the regulator and acts in opposition to electro-magnet coil 24 which is supplied from the same source through the choke coil 16.

The current in the disc 21 is approximately 180° out of phase with the flux through the electro-magnet coils 24 and 26. The cores of the coils are each provided with a shading coil arranged in such manner that the one shading coil produces a flux which is approximately 90° out of phase and the other shading coil produces a flux which is approximately in phase with the disc current. Suitable determination of the coil dimensions and a simple detuning of the choke coil thus permits an adjustment of the frequency difference at which the relay closes its contacts and which is invariable regardless of sharp variations in the operating voltage. Rotation of disc 21 controls the movement of a spring held pivotally mounted contact member 31 against a fixed contact 32 whereby the circuit from current source 11 to relay 12 is closed and the circuit is completed to coil 9 of the circuit breaker 8. Movable contact 31 is fastened to spindle 22 by a band or cord 33 which is wound on or unwound from the spindle upon rotation of disc 21 thereby closing or permitting opening of contacts 31 and 32, under the action of the opening spring connected with contact 31, dependent on the direction of rotation of the disc 21. If the coils of electromagnets 24 and 26 are connected to the lines 6 and 7 for a sufficient length of time, disc 21 will be rotated far enough to wind up cord 33 and contacts 31 and 32 will be closed. It will be seen that electro-magnet coils 24 and 26 are so connected with lines 6 and 7 that, when the phases in the two lines coincide, the total voltage across the coils is twice that of each line.

The regulating device shown in diagrammatic form at 14 in Fig. 1, is shown in perspective in Fig. 3 with its details so arranged as to illustrate the construction thereof clearly. The regulator 14 may be divided into a motive or operating system and a regulating system which controls the voltage supplied to the coil 26 of relay 13. The motive system which is responsive to the phase position of the sources to be connected includes a shaft 36 mounted in jewelled pivoting cups 37 and carrying a drum 39 surrounding a fixed core 38. The drum 39 is rotated by a torque produced thereon by sets of electro-magnetic coils 41 and 42 supplied from the lines 6 and 7, to be connected in parallel, through transformers 17 and 18. The motive system including core 38, drum 39 and sets of coils 41, 42 operates on the principle of an induction type split phase motor.

The regulating system includes adjustable resistances 46 and 47, the several taps of which are connected with contact blocks 48 and 49 arranged on an arc of a circle. The amount of each of the resistances 46 and 47 in circuit with relay coil 26 is controlled by contact sectors 51 and 52 which are supported in jewelled cups 53 and 54 from a member 56 clamped on a sleeve 57 about the shaft 36. The one end of member 56 extends between a pair of stops 58 secured on the housing (not shown) of the regulator and the other end of member 56 extends between a pair of stops 59 extending from an extension 61 of a clutch plate 62 on the shaft 36 which extension 61 is also connected with member 56 through a spring 63. A second extension 64 of clutch plate 62 extends between an electric light 66 and a strip of ground glass 67 to serve as an indicator of the regulator movements. When clutch plate 62 is held in contact with an annular friction plate 70 secured on a second clutch plate 68, which is mounted on shaft 36; by a spring 69 held between the plate 62 and a hub 71 on the shaft 36 within a sleeve 72 formed on the plate 62, movement of indicator 64 behind the ground glass 67 is obtained. A spring 73 having one end affixed to sleeve 72 and the other end thereof affixed to a toothed housing 74 for the purpose of causing the return of all of the movable portions of the regulator to a zero position upon cessation of the torque on drum 39. The tension of spring 73 may be adjusted by rotation of a worm gear 76 mounted on the regulator housing (not shown) and engaging with the spring housing 74.

The torque acting on drum 39 is zero when the phases of lines 6 and 7 coincide and the drum will then be in the neutral position. However, when there is a phase difference between the lines to be connected, the drum 39 revolves in one direction or the other and by means of the spring 63, which maintains member 56 in contact with one of the stops 59 on extension 61, moves the member 56. Rotation of the drum 39 therefore causes movement of member 56 and hence of sectors 51 and 52 thereby causing variation of the amount of resistances 46 and 47 in circuit with the closing coil 26 of relay 13 shown in detail in Fig. 2, which decreases the amount of current flowing therethrough. As soon as the drum and the sectors 51 and 52 reach a position determined by contact of member 56 with one of the stops 58, the resistances 46 and 47 being out of circuit, coil 26 of the relay shown in Fig. 2 will be short circuited and contact 31 will be kept open by the opposing action of coil 24 which is supplied with current from the transformer through the saturated choke coil 16.

Further rotation of drum 39 produces further movement of extension 61 and moves a stop 59, previously engaging member 56, away from the member which is retained by stop 58 until the opposite stop 59 is brought into contact with member 56 which is maintained in the previous position by spring 63. Further rotation of the drum 39 now merely produces slipping of the clutch 62, 68.

When lines 6 and 7 approach phase coincidence, the torque on drum 39 will decrease and the entire moving system will begin to return to the neutral position under the action of spring 73. When phase coincidence is reached, extension 61 is in the neutral position. But before the neutral position is reached, the sectors 51 and 52 will have reached their neutral position because member 56 follows one of the stops 59 which lead extension 61 by a certain adjustable angle. If sectors 51 and 52 pass slowly through the neutral position, a voltage will be impressed on coil 26 of the relay 13 for a sufficient length of time to cause the torque exerted thereby on disc 22 to close contacts 31 and 32 against the action of the coil 24 on the disc. A circuit is then established from source 11 to contacts 31 and 32, to the operating coil of relay 12 and to the closing coil 9 of circuit breaker 8 whereupon relay 12 shunts contacts 31 and 32, and its operating coil through its holding coil. Circuit breaker 8 closes and interrupts the circuit of source 11. During the time required for the operation of contacts 31 and 32, relay 12 and circuit breaker 8, exact phase coincidence of lines 6 and 7 will have been reached thereby avoiding disturbances due to improper connection of the lines.

When the phase angle between lines 6 and 7 is varying the entire moving system will oscillate including extension 64. Lamp 66 receives a voltage from the circuit of coils 41 and 42 which voltage pulsate dependent on the relative angular differences of the two lines. With the connection as shown, lamp 16 will be bright intermittently and indicator 64 will oscillate at the same frequency and its shadow on ground glass 67 will appear only when the indicator is moving in one direction. The direction of its appearance is determined by the relative frequencies of lines 6 and 7 therefore indicating the speed variation required for the incoming machine.

The entire system may be adjusted to meet different speeds of operation of the circuit breaker by adjustment of the distance between stops 59 thereby changing the angle by which the sectors 51 and 52 lead the drum 39. The speed of response of the system to phase differences of the line may be adjusted by variation of resistance 19. To insure proper operation of contacts 31 and 32 even when the line voltages differ from the normal values, a saturated choke coil 16 is placed in series with coil 24 thereby insuring constant action on the disc 21 for the purpose of opening the contacts 31 and 32 independently of voltage variation.

Although but one embodiment of the present invention has been illustrated and described, it will be apparent to those skilled in the art that various changes and modifications may be made therein without departing from the spirit of the invention or from the scope of the appended claims.

The invention claimed is:

1. In a system for automatically connecting alternating current systems when synchronized, a plurality of alternating current systems to be connected, a circuit breaker for connecting said systems, a coil for electromagnetically causing closing of said circuit breaker, a source of current applicable to said coil to cause energization thereof, a relay for applying said source of current to said coil, a relay responsive to the frequency relations of said systems to cause operation of said first relay, and comprising a disc and two electromagnets, a regulator responsive to the phase relations of said systems, a voltage transformer connected with each of said systems, and a choke coil, one of the electro-magnets being supplied from said transformers through said regulator and the other of the electro-magnets being supplied from said transformer through said choke coil.

2. In a system for automatically connecting alternating current systems when synchronized, a plurality of alternating current systems to be connected, a circuit breaker for connecting said systems, a coil for electromagnetically causing the closing of said circuit breaker, a source of current applicable to said coil to cause energization thereof, a relay for applying said source of current to said coil, a relay responsive to the frequency relation of said system to cause operation of said first relay, a regulator responsive to the phase relations of said system to control the operation of said second relay, voltage transformers connected with said systems to supply said second relay and said regulator, said regulator comprising a voltage system and a regulating system, the motive system being capable of rotating the regulating system only between pre-determined limits, and a friction clutch connecting the motive system and the regulating system.

3. In combination with a pair of alternating current circuits to be connected in parallel when synchronized, and a circuit breaker operable to establish the said connection, of a relay having a pair of electro-magnets connected to be conjointly energized responsive to and in dependence upon the vectorial sum of the potentials of said circuits to thereby cause said circuit breaker to establish said connection, a regulator comprising a movable element operable to vary the extent of energization of one of said magnets in dependence upon the extent of movement of said element, and electro-dynamic means connected to be actuated to cause movement of said element in extent in dependence upon the phase relations of the potentials of said circuits to thereby effect actuation of said relay to cause said operation of said circuit breaker upon the potentials of said circuits attaining a predetermined phase relation.

4. In combination, a pair of alternating current circuits to be connected in parallel, a switch disposed to be actuated to establish said connections, a coil operable upon energization thereof to electro-magnetically cause said actuation of said switch, a source of current applicable for operative connection with said coil to cause energization thereof, a relay comprising cooperative circuit closing members operable to establish said connections of said source of current, and a pair of electro-magnets each connected with and conjointly energized responsive to and in dependence upon the vectorial sum of the potentials of said circuits when within a predetermined degree of synchronism as to frequency and phase to effect circuit closing operation of said members, a reactance coil included in series connection with one of said electro-magnets operable to control the degree of energization thereof, and a regulator comprising a plurality of variable resistance elements disposed to be serially connected in circuit with the other of said electro-magnets, and a motive system comprising a pair of electro-magnets connected with and responsive respectively to the potentials of said circuits operative to cause variation of the effective amount of the resistance of said elements in dependence upon the frequency and phase relations of said circuits.

5. In combination with a pair of alternating current circuits to be connected in parallel, a switch disposed to be actuated to establish said connection having a coil operable upon energization thereof to electro-magnetically cause said actuation of said switch, a source of current applicable for operative connection with said coil to cause energization thereof, a relay comprising cooperating members operable to circuit closing position and circuit opening position to thereby establish and interrupt said operative connections of said source with the said coil, and a pair of electro-magnets each connected to be conjointly energized responsive to and in dependence upon the vectorial sum of the instantaneous potentials of said circuits, the energization of one of said magnets tending to cause circuit opening actuation of said members and the actuation of the other of said magnets tending to cause circuit closing actuation of said members, a reactance coil having a saturated core serially connected in circuit with said one of said magnets operative to regulate the extent of energization thereof, a regulator comprising a plurality of variable resistance elements disposed to be serially connected in circuit with the said other of said magnets to regulate the extent of energization thereof, and a motive system comprising a pair of electro-magnets connected with and being respectively responsive to the potentials of said circuits to thereby cause variations of the effective amount of the resistances of said elements in dependence upon the frequency and phase relations of said circuits to thereby cause energization of the said other of said magnets to be energized to an extent such as to cause circuit closing actuation of said member upon the said circuits attaining a predetermined phase and frequency relation.

6. In combination with a pair of alternating current circuits to be connected in parallel, a switch disposed to be actuated to automatically establish said connection having a coil operable upon energization thereof to cause said actuation, a source of current applicable for operative connection with said coil to cause said energization thereof, a relay comprising a pair of contacts normally biased to circuit opening position operable to circuit closing position to establish said connection of said source of current with the said coil, and a pair of electro-magnets connected to be conjointly energized responsive to and in degree in dependence upon the vectorial sum of the instantaneous potentials of said circuits, the energization of one of said magnets tending to maintain said circuit opening position of said contacts and the energization of the other of said magnets tending to cause circuit closing actuation of said contacts, a reactance coil serially connected in circuit with the said one of said magnets having a core subject to saturation upon the said potentials attaining normal value to thereby regulate the extent of energization of the said one of said magnets, a regulator comprising a pair of variable resistances disposed to be serially connected in circuit with said other of said magnets to regulate the extent of energization thereof, and a motive system comprising a pair of electro-magnets connected with and being respectively energized responsive to the potentials of said circuits to cause variations of the effective amounts of said resistances in dependence upon the differences in frequency and phase relations of the said circuits to thereby cause circuit closing actuation of said contacts upon the said circuits attaining a phase and frequency relation within a predetermined degree of synchronism and whereby circuit closing actuation of said contacts is prevented during predetermined phase and frequency relations of said circuits.

In testimony whereof, I have hereunto subscribed my name this 4th day of February, A. D. 1931.

ROBERT KELLER.